US011584369B2

(12) United States Patent
Zhang et al.

(10) Patent No.: US 11,584,369 B2
(45) Date of Patent: Feb. 21, 2023

(54) COLLISION DETECTION METHOD AND APPARATUS BASED ON AN AUTONOMOUS VEHICLE, DEVICE AND STORAGE MEDIUM

(71) Applicant: Apollo Intelligent Driving Technology (Beijing) Co., Ltd., Beijing (CN)

(72) Inventors: Hongda Zhang, Beijing (CN); Kai Yang, Beijing (CN); Lei Zhang, Beijing (CN); Qijuan Yin, Beijing (CN); Wuzhao Zhang, Beijing (CN); Xiaoyan Wang, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 645 days.

(21) Appl. No.: 16/514,202

(22) Filed: Jul. 17, 2019

(65) Prior Publication Data

US 2020/0070823 A1 Mar. 5, 2020

(30) Foreign Application Priority Data

Aug. 30, 2018 (CN) .......................... 201811005086.1

(51) Int. Cl.
*G06T 7/11* (2017.01)
*B60W 30/095* (2012.01)
*G06T 7/70* (2017.01)

(52) U.S. Cl.
CPC .......... *B60W 30/0956* (2013.01); *G06T 7/11* (2017.01); *G06T 7/70* (2017.01); *G06T 2207/10028* (2013.01); *G06T 2207/30261* (2013.01)

(58) Field of Classification Search
CPC ........ B60W 30/0956; G06T 7/11; G06T 7/70; G06T 2207/10028; G06T 2207/30261
(Continued)

(56) References Cited

U.S. PATENT DOCUMENTS

2005/0125155 A1* 6/2005 Kudo ..................... B62D 6/002
701/301
2007/0219720 A1* 9/2007 Trepagnier ........... G05D 1/0278
701/300
(Continued)

FOREIGN PATENT DOCUMENTS

CN 101542554 A 9/2009
CN 106548486 A 3/2017
(Continued)

*Primary Examiner* — Tyler J Lee
*Assistant Examiner* — Tiffany P Ohman
(74) *Attorney, Agent, or Firm* — Harness, Dickey & Pierce, P.L.C.

(57) ABSTRACT

Embodiments of the present application provide a collision detection method and apparatus based on an autonomous vehicle, a device and a storage medium, where the method includes: acquiring first point cloud data of each obstacle in each region around the autonomous vehicle, where the first point cloud data represents coordinate information of the obstacle and the first point cloud data is based on a world coordinate system; converting the first point cloud data of the each obstacle into second point cloud data based on a relative coordinate system, where an origin of the relative coordinate system is a point on the autonomous vehicle; determining, according to the second point cloud data of the each obstacle in all regions, a possibility of collision of the autonomous vehicle. A de-positioning manner for collision detection is provided, thereby improving the reliability and stability of collision detection.

17 Claims, 5 Drawing Sheets

(58) Field of Classification Search
USPC .......................................................... 701/301
See application file for complete search history.

(56) References Cited

U.S. PATENT DOCUMENTS

2009/0265107 A1* 10/2009 Matsuno ................ G08G 1/165
    701/301
2019/0310378 A1* 10/2019 Ho ............................ G06T 7/11

FOREIGN PATENT DOCUMENTS

| CN | 106802668 A | 6/2017 |
| CN | 106908775 A | 6/2017 |
| CN | 106997049 A | 8/2017 |
| CN | 107272735 A | 10/2017 |
| CN | 107284354 A | 10/2017 |

* cited by examiner

COLLISION DETECTION METHOD AND APPARATUS BASED ON AN AUTONOMOUS VEHICLE, DEVICE AND STORAGE MEDIUM

CROSS-REFERENCE TO RELATED APPLICATIONS

The present application claims priority to Chinese application No. 201811005086.1, filed on Aug. 30, 2018, which is incorporated by reference in its entirety.

TECHNICAL FIELD

The present application relates to the field of autonomous vehicle technologies, more particularly, to a collision detection method and apparatus based on an autonomous vehicle, a device, and a storage medium.

BACKGROUND

With the development of the intelligent technology, autonomous vehicles have been developed and applied. During the driving process of the autonomous vehicles, the autonomous vehicles often meet obstacles, and then need to avoid the obstacles.

In the prior art, laser radar can be adopted to collect position information of obstacles for an autonomous vehicle, the position information is a kind of point cloud data that is based on a high-precision world coordinate system, and the possibility of collision of the autonomous vehicle can then be calculated according to the point cloud data.

However, in the prior art, when determining the possibility of collision of an autonomous vehicle, the world coordinate system is required for determining the possibility of collision of the autonomous vehicle, but when using the world coordinate system, it is necessary to depend on a positioning module, and further depend on more modules indirectly; and the subsystem which is used to calculate parameters based on the world coordinate system will bring some unreliability, thereby resulting in unreliable collision detection.

SUMMARY

The embodiments of the present application provides a collision detection method and apparatus based on an autonomous vehicle, a device, and a storage medium, so as to solve the problem in the above solution.

A first aspect of the present application provides a collision detection method based on an autonomous vehicle, including:

acquiring first point cloud data of each obstacle in each region around the autonomous vehicle, where the first point cloud data represents coordinate information of the obstacle, and the first point cloud data is based on a world coordinate system;

converting the first point cloud data of the each obstacle into second point cloud data based on a relative coordinate system, where an origin of the relative coordinate system is a point on the autonomous vehicle;

determining, according to the second point cloud data of the each obstacle in all regions, a collision risk value, where the collision risk value represents a possibility of collision of the autonomous vehicle.

Further, the origin of the relative coordinate system is a center point of the autonomous vehicle, an X-axis of the relative coordinate system is a central axis of the autonomous vehicle, a Y-axis of the relative coordinate system passes through the origin and is perpendicular to the X-axis, the Z-axis of the relative coordinate system passes through the origin, and the Z-axis of the relative coordinate system is perpendicular to both the X-axis and the Y-axis.

Further, the determining, according to the second point cloud data of the each obstacle in all regions, the collision risk value, includes:

determining, according to the second point cloud data of the each obstacle, an obstacle speed of the each obstacle;

determining, according to obstacle speeds of all obstacles within the each region, a regional risk value of the each region;

determining, according to the regional risk values of all the regions, the collision risk value.

Further, the determining, according to the second point cloud data of the each obstacle, an obstacle speed of the each obstacle, includes:

determining, according to the second point cloud data of the each obstacle on at least two frames, a displacement value of the each obstacle;

determining, according to both the displacement value of the each obstacle and times corresponding to the at least two frames, the obstacle speed of the each obstacle.

Further, after determining, according to the second point cloud data of the each obstacle, the obstacle speed of the each obstacle, the method further includes:

acquiring the obstacle speed of the each obstacle on previous N frames, where N is a positive integer great than or equal to 1;

correcting, according to the obstacle speed of the each obstacle on the previous N frames, the obstacle speed of the each obstacle, to obtain a corrected obstacle speed of the each obstacle.

Further, the determining, according to the obstacle speeds of all obstacles in the each region, a regional risk value of the each region, includes:

performing a weighted calculation on the obstacle speeds of all obstacles in the each region to obtain the regional risk value of the each region.

Further, the determining, according to the obstacle speeds of all obstacles in the each region, a regional risk value of the each region, includes:

determining, according to the obstacle speeds of all obstacles in the each region, a test obstacle in the each region;

acquiring an actual distance and a safety distance of the test obstacle in the each region, where the actual distance represents the actual distance between the test obstacle and the autonomous vehicle, and the safety distance represents the safety distance between the test obstacle and the autonomous vehicle;

determining a difference between the actual distance and the safety distance of the test obstacle in the each region as the regional risk value of the each region.

Further, the acquiring the actual distance of the test obstacle in the each region, includes:

determining, according to the second point cloud data of the test obstacle in the each region, the actual distance of the test obstacle in the each region.

Further, the acquiring the safety distance of the test obstacle in the each region, includes:

acquiring an autonomous vehicle acceleration and an autonomous vehicle speed of the autonomous vehicle and acquiring an obstacle acceleration of the test obstacle in the each region;

determining, according to the obstacle acceleration of the test obstacle in the each region, the obstacle speed of the test obstacle in the each region, and the autonomous vehicle acceleration and the autonomous vehicle speed, the safety distance of the test obstacle in the each region.

Further, the determining, according to the regional risk values of all the regions, the collision risk value, includes:

performing, according to a preset collision risk weight corresponding to the each region in a one-to-one relationship, a weighted calculation on the regional risk values of all the regions, to obtain the collision risk value.

Further, the determining, according to the regional risk values of all the regions, the collision risk value, includes:

perform a calculation on the regional risk values of all the regions by adopting a linear judgment manner to obtain the collision risk value.

A second aspect of the present application provides a collision detection apparatus based on an autonomous vehicle, including:

an acquisition unit, configured to acquire first point cloud data of each obstacle in each region around the autonomous vehicle, where the first point cloud data represents coordinate information of the obstacle, and the first point cloud data is based on a world coordinate system;

a conversion unit, configured to convert the first point cloud data of the each obstacle into second point cloud data based on a relative coordinate system, where an origin of the relative coordinate system is a point on the autonomous vehicle;

a determination unit, configured to determine, according to the second point cloud data of the each obstacle in all regions, a collision risk value, where the collision risk value represents a possibility of collision of the autonomous vehicle.

Further, the origin of the relative coordinate system is a center point of the autonomous vehicle, an X-axis of the relative coordinate system is an central axis of the autonomous vehicle, a Y-axis of the relative coordinate system passes through the origin and is perpendicular to the X-axis, the Z-axis of the relative coordinate system passes through the origin, and the Z-axis of the relative coordinate system is perpendicular to both the X-axis and the Y-axis.

Further, the determination unit includes:

a first determination module, configured to determine, according to the second point cloud data of the each obstacle, an obstacle speed of the each obstacle;

a second determination module, configured to determine, according to the obstacle speeds of all obstacles in the each region, a regional risk value of the each region;

a third determination module, configured to determine, according to the regional risk values of all the regions, the collision risk value.

Further, the first determination module includes:

a first determination sub-module, configured to determine, according to the second point cloud data of the each obstacle on at least two frames, a displacement value of the each obstacle;

a second determination sub-module, configured to determine, according to both the displacement value of the each obstacle and times corresponding to the at least two frames, the obstacle speed of the each obstacle.

Further, the determination unit further includes:

an acquisition module, configured to acquire the obstacle speed of the each obstacle on previous N frames after the first determination module determines, according to the second point cloud data of the each obstacle, the obstacle speed of the each obstacle, where N is a positive integer great than or equal to 1;

a correction module, configured to correct, according to the obstacle speed of the each obstacle on the previous N frames, the obstacle speed of the each obstacle, to obtain a corrected obstacle speed of the each obstacle.

Further, the second determination module includes:

a calculation sub-module, configured to perform a weighted calculation on the obstacle speeds of all obstacles in the each region to obtain the regional risk value of the each region.

Further, the second determination module includes:

a third determination sub-module, configured to determine, according to the obstacle speeds of all obstacles in the each region, a test obstacle in the each region;

an acquisition sub-module, configured to acquire an actual distance and a safety distance of the test obstacle in the each region, where the actual distance represents the actual distance between the test obstacle and the autonomous vehicle, and the safety distance represents the safety distance between the test obstacle and the autonomous vehicle;

a confirmation sub-module, configured to determine a difference between the actual distance and the safety distance of the test obstacle in the each region as the regional risk value of the each region.

Further, the acquisition sub-module is specifically configured to:

determine, according to the second point cloud data of the test obstacle in the each region, the actual distance of the test obstacle in the each region.

Further, the acquisition sub-module is specifically configured to:

acquire an autonomous vehicle acceleration and an autonomous vehicle speed of the autonomous vehicle and acquire an obstacle acceleration of the test obstacle in the each region;

determine, according to the obstacle acceleration of the test obstacle in the each region, the obstacle speed of the test obstacle in the each region, and the autonomous vehicle acceleration and the autonomous vehicle speed, the safety distance of the test obstacle in the each region.

Further, the third determination module is specifically configured to:

perform, according to a preset collision risk weight corresponding to the each region in a one-to-one relationship, a weighted calculation on the regional risk values of all the regions to obtain the collision risk value.

Further, the third determination module is specifically configured to:

perform a calculation on the regional risk values of all the regions by adopting a linear judgment manner, to obtain the collision risk value.

A third aspect of the present application provides a control device, including: a transmitter, a receiver, a memory, and a processor;

where the memory is configured to store computer instructions; the processor is configured to execute the computer instructions stored in the memory to implement the collision detection method based on an autonomous vehicle provided by any of the implementations of the first aspect.

A fourth aspect of the present application provides a storage medium, including: a readable storage medium and computer instructions, where the computer instructions are stored in the readable storage medium; the computer instructions are configured to implement the collision detection method based on an autonomous vehicle provided by any of the implementations of the first aspect.

The collision detection method and apparatus based on an autonomous vehicle, the device and the storage medium provided by the embodiment of the present application acquire first point cloud data of each obstacle in each region around the autonomous vehicle, where the first point cloud data represents coordinate information of the obstacle and the first point cloud data is based on a world coordinate system; convert the first point cloud data of each obstacle into second point cloud data based on a relative coordinate system, where an origin of the relative coordinate system is a point on the autonomous vehicle; determine, according to the second point cloud data of each obstacle in all regions, a collision risk value, where the collision risk value represents a possibility of collision of the autonomous vehicle. Therefore, the possibility of collision of the autonomous vehicle is judged in real time and accurately during the operation of the autonomous vehicle. In addition, the solution provides a de-positioning manner for collision detection without depending on the world coordinate system, and without depending on more modules or on subsystems based on parameters of the world coordinate system, thereby improving the reliability and stability of collision detection. Moreover, when the positioning system of the autonomous vehicle fails, the collision detection can be completed by adopting this solution.

BRIEF DESCRIPTION OF THE DRAWINGS

In order to illustrate the technical solutions in the embodiments of the present application or the prior art more clearly, a brief description of the drawings required in description of the embodiment or the prior art will be given below. Obviously, the drawings in the following description are some embodiments of the present application, and other drawings can be obtained according to these drawings without any creative efforts for those skilled in the art.

DESCRIPTION OF EMBODIMENTS

In order to make the purpose, technical solution and advantages of the embodiment of the present application clearer, a clear and complete description of the technical solution in the embodiment of the present application will be given below with reference to the attached drawings in the embodiment of the present application. Obviously, the described drawings are some of the embodiments of the present application rather than all of them. All other drawings obtained by those skilled based on the embodiment of the present application without any creative effort fall within the scope of protection of the present application.

In the prior art, laser radar can be adopted to collect position information of obstacles of an autonomous vehicle, the position information is a kind of point cloud data that is based on a high-precision world coordinate system, and the possibility of collision of the autonomous vehicle can then be calculated according to the point cloud data.

However, in the prior art, when determining the possibility of collision of an autonomous vehicle, the world coordinate system needs to be used to determine the possibility of collision of the autonomous vehicle, but when using the world coordinate system, it is necessary to depend on a positioning module, and further depend on more modules indirectly; and the subsystem which is used to calculate the parameters based on the world coordinate system will bring some unreliability, thereby resulting in unreliable collision detection.

For the above problem, the present application provides a method collision detection method and apparatus based on an autonomous vehicle, a device and a storage medium that provide a de-positioning manner for collision detection without depending on the world coordinate system, and without depending on more modules or on subsystems based on parameters of the world coordinate system, thereby improving the reliability and stability of collision detection. Moreover, when the positioning system of the autonomous vehicle fails, the collision detection can be completed by adopting this solution. The solution will be described in detail below through several specific embodiments.

Figure 1:
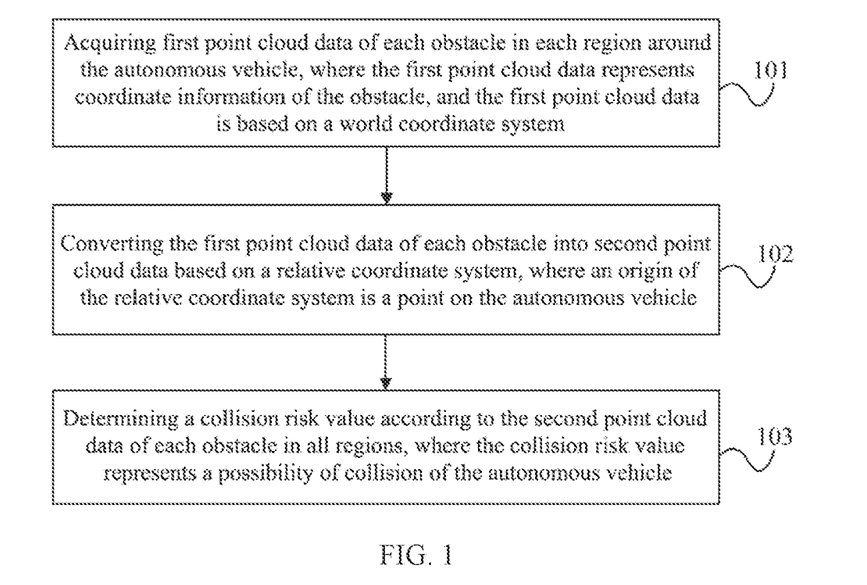
FIG. 1 is a flowchart of a collision detection method based on an autonomous vehicle according to an embodiment of the present application.

FIG. 1 is a flowchart of a collision detection method based on an autonomous vehicle according to an embodiment of the present application. As shown in FIG. 1, the execution body of the solution is a controller of the autonomous vehicle, a control device of an automatic driving system of the autonomous vehicle, and the like. The collision detection method based on an autonomous vehicle includes:

Step 101, acquiring first point cloud data of each obstacle in each region around the autonomous vehicle, where the first point cloud data represents coordinate information of the obstacle, and the first point cloud data is based on a world coordinate system.

In this step, specifically, the present embodiment is described by taking a controller of the autonomous vehicle as the execution body.

A detection apparatus is set on the autonomous vehicle, and the detection apparatus may be any one of the following: a radar sensor of a main automatic driving system, an independent radar sensor, ultrasonic radar, and millimeter wave radar. The detection apparatus can detect the surrounding environment of the autonomous vehicle and acquire point cloud data of obstacles surrounding the autonomous vehicle.

Since there is more than one obstacle around the autonomous vehicle, the surrounding region of the autonomous vehicle can be divided into a plurality of regions. For example, the front side, the rear side, the left side and the right side of the autonomous vehicle are divided to be one region, respectively, to obtain four regions; alternatively, a rectangular coordinate system is established with the center point of the autonomous vehicle as the origin, a straight line along the front-rear direction of the autonomous vehicle as the X-axis and a straight line passing through the center point and being perpendicular to the X-axis as the Y-axis, and the region in the rectangular coordinate system is divided into a plurality of blocks to obtain a plurality of regions. The present application is not limited to the region division manner for the surrounding region of the autonomous vehicle.

Figure 2:
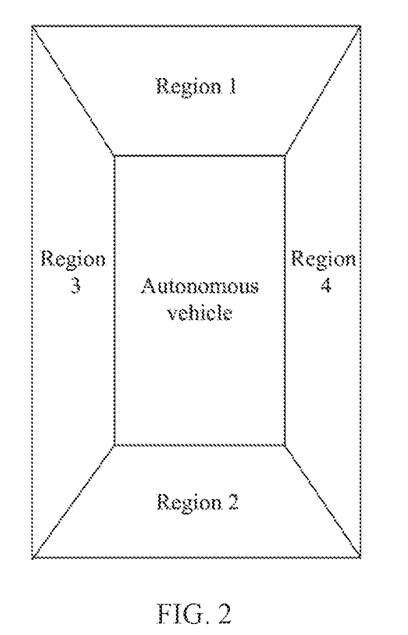
FIG. 2 is a Region Division Diagram I in a collision detection method based on an autonomous vehicle according to an embodiment of the present application.

For example, FIG. 2 is a Region Division Diagram I in a collision detection method based on an autonomous vehicle according to an embodiment of the present application. As shown in FIG. 2, the surrounding region of the autonomous vehicle is divided to obtain region 1, region 2, region 3, and region 4.

Figure 3:
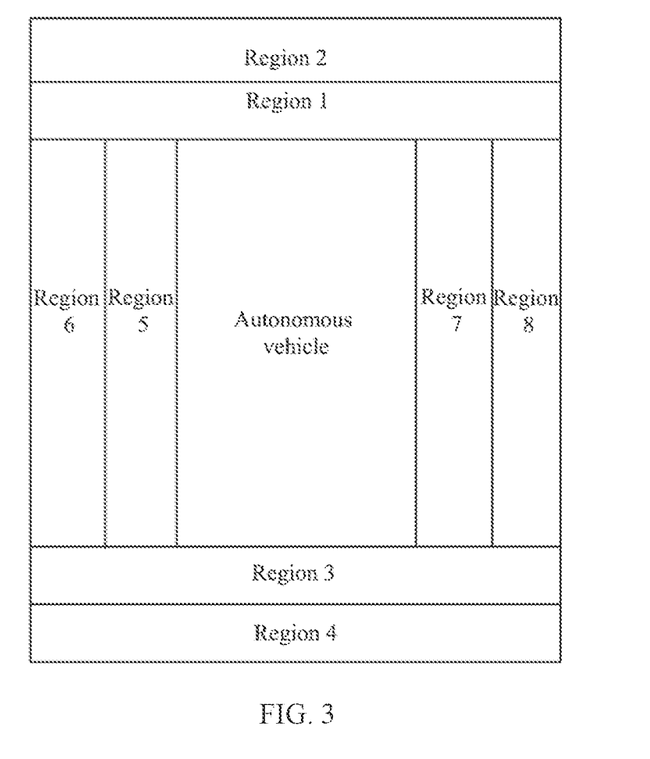
FIG. 3 is a Region Division Diagram II in a collision detection method based on an autonomous vehicle according to an embodiment of the present application.

For another example, FIG. 3 is a Region Division Diagram II of a collision detection method based on an autonomous vehicle according to an embodiment of the present application. As shown in FIG. 3, the surrounding region of the autonomous vehicle is divided to obtain region 1, region 2, region 3, region 4, region 5, region 6, region 7, and region 8.

During the driving process of the autonomous vehicle, for example, the detection apparatus detects first point cloud data of each obstacle when the autonomous vehicle is going straight or turning and an obstacle appears near the autonomous vehicle, or when the positioning system of the autonomous vehicle fails. Since the region surrounding the autonomous vehicle is divided, the controller of the autonomous vehicle can map each obstacle to a region after the controller of the autonomous vehicle acquires the first point cloud data of each obstacle detected by the detection apparatus, and can thus obtain the first point cloud data of each obstacle in each region.

First point cloud data represents coordinate information of an obstacle corresponding to the first point cloud data, and the first point cloud data is based on a world coordinate system.

For example, based on the region division diagram of FIG. 2, the controller of the autonomous vehicle acquires the first point cloud data of an obstacle a, the first point cloud data of an obstacle b and the first point cloud data of an obstacle c in the region 1, acquires the first point cloud data of an obstacle d and the first point cloud data of an obstacle e in the region 2, acquires the first point cloud data of an obstacle f and the first point cloud data of an obstacle g in the region 3, and acquires the first point cloud data of an obstacle h and the first point cloud data of an obstacle i in the region 4.

Step 102, converting the first point cloud data of each obstacle into second point cloud data based on a relative coordinate system, where an origin of the relative coordinate system is a point on the autonomous vehicle.

Optionally, the origin of the relative coordinate system is a center point of the autonomous vehicle, an X-axis of the relative coordinate system is a central axis of the autonomous vehicle, a Y-axis of the relative coordinate system passes through the origin and is perpendicular to the X-axis, the Z-axis of the relative coordinate system passes through the origin, and the Z-axis of the relative coordinate system is perpendicular to both the X-axis and the Y-axis.

In this step, specifically, the controller of the autonomous vehicle converts the acquired first point cloud data of each obstacle into the second point cloud data based on the relative coordinate system, where the origin of the relative coordinate system is a point on the autonomous vehicle.

Preferably, the origin of the relative coordinate system is the center point of the autonomous vehicle, the center axis of the autonomous vehicle is taken as the X-axis of the relative coordinate system, a straight line passing through the origin and being perpendicular to the X-axis is taken as the Y-axis of the relative coordinate system, and the straight line passing through the origin and being perpendicular to both the X-axis and the Y-axis is taken as the Z-axis of the relative coordinate system, thus a relative coordinate system is established.

Step 103, determining a collision risk value according to the second point cloud data of each obstacle in all regions, where the collision risk value represents a possibility of collision of the autonomous vehicle.

In this step, specifically, since the second point cloud data of each obstacle is based on the above relative coordinate system, the second point cloud data represents the position information between the obstacle and the autonomous vehicle, thus the controller of the autonomous vehicle can judge the possibility of collision of the autonomous vehicle according to the second point cloud data of each obstacle in all regions, thereby determining the collision risk value.

The present embodiment acquires first point cloud data of each obstacle in each region around the autonomous vehicle, where the first point cloud data represents coordinate information of the obstacle and the first point cloud data is based on a world coordinate system; converts the first point cloud data of each obstacle into second point cloud data based on a relative coordinate system, where an origin of the relative coordinate system is a point on the autonomous vehicle; determines, according to the second point cloud data of each obstacle in all regions, a collision risk value, where the collision risk value represents a possibility of collision of the autonomous vehicle. Therefore, the possibility of collision of the autonomous vehicle is judged in real time and accurately during the operation of the autonomous vehicle. In addition, the solution provides a de-positioning manner for collision detection without depending on the world coordinate system and without depending on more modules or on subsystems based on parameters of the world coordinate system, thereby improving the reliability and stability of collision detection. Moreover, when the positioning system of the autonomous vehicle fails, the collision detection can be completed by adopting this solution.

Figure 4:
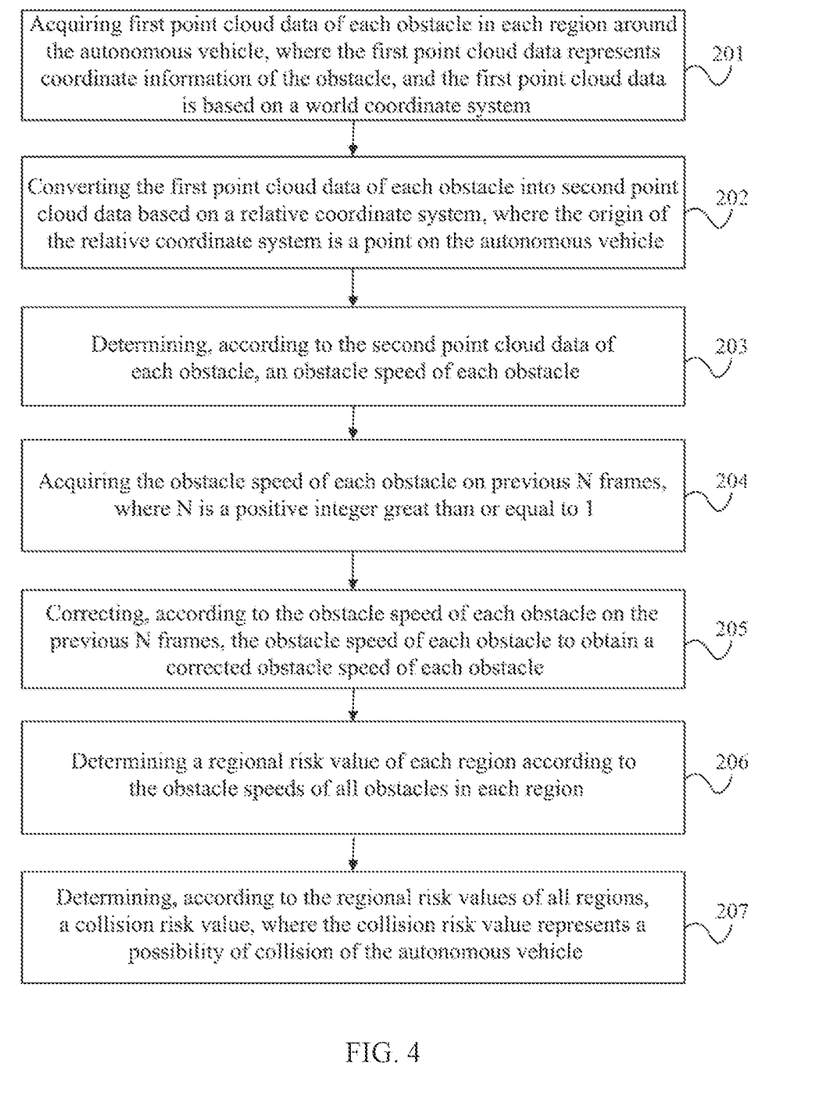
FIG. 4 is a flowchart of another collision detection method based on an autonomous vehicle according to an embodiment of the present application.

FIG. 4 is a flowchart of another collision detection method based on an autonomous vehicle according to an embodiment of the present application. As shown in FIG. 4, the execution body of the solution is a controller of the autonomous vehicle, a control device of an automatic driving system of the autonomous vehicle, or the like. The collision detection method based on an autonomous vehicle includes:

Step 201, acquiring first point cloud data of each obstacle in each region around the autonomous vehicle, where the first point cloud data represents coordinate information of the obstacle, and the first point cloud data is based on a world coordinate system.

In this step, specifically, this step may refer to step 101 shown in FIG. 1, which will not be repeated herein.

Step 202, converting the first point cloud data of each obstacle into second point cloud data based on a relative coordinate system, where the origin of the relative coordinate system is a point on the autonomous vehicle.

Optionally, the origin of the relative coordinate system is the center point of the autonomous vehicle, an X-axis of the relative coordinate system is a central axis of the autonomous vehicle, a Y-axis of the relative coordinate system passes through the origin and is perpendicular to the X-axis, a Z-axis of the relative coordinate system passes through the origin, and the Z-axis of the relative coordinate system is perpendicular to both the X-axis and the Y-axis.

In this step, specifically, refer to step 102 shown in FIG. 1 for this step, which will not be repeated herein.

Step 203, determining, according to the second point cloud data of each obstacle, an obstacle speed of each obstacle.

The step 203 specifically includes:

Step 2031, determining, according to the second point cloud data of each obstacle on at least two frames, a displacement value of each obstacle.

Step 2032, determining, according to both the displacement value of each obstacle and times corresponding to the at least two frames, the obstacle speed of each obstacle.

In this step, specifically, the controller of the autonomous vehicle can acquire the second point cloud data of each obstacle on multiple frames. For each obstacle in each region, the controller of the autonomous vehicle determines the displacement value of the obstacle according to the second point cloud data of the obstacle within different frames, and the displacement value represents the displacement of the obstacle in a certain time. Since the frame corresponds to the time, the controller of the autonomous vehicle can determine the time corresponding to the displacement value. The controller of the autonomous vehicle determines the obstacle speed of the obstacle according to both the displacement value and time of the obstacle.

For example, based on the region division diagram of FIG. 2, the controller of the autonomous vehicle acquires the first point cloud data 1 of the obstacle a in the region 1 on the first frame, and can acquire the first point cloud data 2 of the obstacle a in the region 1 on the second frame over time. The controller of the autonomous vehicle converts the first point cloud data 1 into the second point cloud data 1, and converts the first point cloud data 2 into the second point cloud data 2. Since each second point cloud data represents the distance information between the obstacle and the autonomous vehicle, and the second point cloud data is based on the above described relative coordinate system, the controller of the autonomous vehicle can determine the displacement information of the obstacle a according to the second point cloud data 1 and the second point cloud data 2, that is, can determine the displacement value; the time difference between the first frame and the second frame is taken as the time; the controller of the autonomous vehicle divides the displacement value by time to obtain the obstacle speed of the obstacle a.

Step 204, acquiring the obstacle speed of each obstacle on previous N frames, where N is a positive integer great than or equal to 1.

In this step, specifically, the obstacle speed of each obstacle can be corrected. After calculating the obstacle speed of each obstacle on each frame in the above manner, the obstacle speed of each obstacle on the previous N frames can be obtained.

Step 205, correcting, according to the obstacle speed of each obstacle on the previous N frames, the obstacle speed of each obstacle to obtain a corrected obstacle speed of each obstacle.

In this step, specifically, after the controller of the autonomous vehicle calculates the obstacle speed of each obstacle on the current frame, the controller of the autonomous vehicle judges whether the obstacle speed of each obstacle on the current frame has changed abruptly according to the obstacle speed of each obstacle on the previous N frames; if it is determined that the obstacle speed of each obstacle on the current frame is too large or too small, it can be determined that the calculation of the obstacle speed of each obstacle on the current frame is incorrect. Then, the controller of the autonomous vehicle can adopt an average value or a weighted average value of the obstacle speed of each obstacle on the previous N frames as the obstacle speed of each obstacle on the current frame, thereby correcting the obstacle speed of each obstacle on the current frame.

For example, based on the region division diagram of FIG. 2, the controller of the autonomous vehicle acquires that the obstacle speed of the obstacle a in the region 1 on the first frame is 2 m/s, the obstacle speed of the obstacle a in the region 1 on the second frame is 2.1 m/s, and the obstacle speed of the obstacle a in the region 1 on the third frame is 1.9 m/s; the controller of the autonomous vehicle acquires that the obstacle speed of the obstacle a in the region 1 on the fourth frame is 9 m/s, then the controller of the autonomous vehicle determines that the speed of the obstacle a on the fourth frame is inaccurate; the controller of the autonomous vehicle can calculate the average value of the obstacle speed of the obstacle a on the first three frames, and obtain the corrected obstacle speed of the obstacle a in the region 1 on the fourth frame of 2 m/s.

Step 206, determining a regional risk value of each region according to the obstacle speeds of all obstacles in each region.

The step 206 includes following implementations:

A first implementation of step 206 includes step 2061*a*:

Step 2061*a*, performing a weighted calculation on the obstacle speeds of all obstacles in each region to obtain the regional risk value of each region.

A second implementation of step 206 includes steps 2061*b* to 2063*b*:

Step 2061*b*, determining, according to the obstacle speeds of all obstacles in each region, a test obstacle in each region.

Step 2062*b*, acquiring an actual distance and a safety distance of the test obstacle in each region, where the actual distance represents the actual distance between the test obstacle and the autonomous vehicle, and the safety distance represents the safety distance between the test obstacle and the autonomous vehicle.

The step 2062*b* specifically includes:

determining, according to the second point cloud data of the test obstacle in each region, the actual distance of the test obstacle in each region; acquiring an autonomous vehicle acceleration and an autonomous vehicle speed of the autonomous vehicle, and acquiring an obstacle acceleration of the test obstacle in each region; determining, according to the obstacle acceleration of the test obstacle in each region, the obstacle speed of the test obstacle in each region, and the autonomous vehicle acceleration and the autonomous vehicle speed, the safety distance of the test obstacle in each region.

Step 2063*b*, determining a difference between the actual distance and the safety distance of the test obstacle in each region as the regional risk value of each region.

In this step, specifically, for each region, the controller of the autonomous vehicle determines the regional risk value of the region according to the obstacle speeds of the obstacles in the region.

The first implementation of this step is that, for each region, the controller of the autonomous vehicle performs a weighted calculation on the obstacle speeds of all obstacles in the region to obtain the regional risk value of the region.

For example, based on the region division diagram of FIG. 2, the controller of the autonomous vehicle acquires the second point cloud data of the obstacle a, the second point cloud data of the obstacle b and the second point cloud data of the obstacle c in the region 1; the controller of the autonomous vehicle calculates the obstacle speed a of the obstacle a, the obstacle speed b of the obstacle b and the obstacle speed c of the obstacle c in the region 1; then, the controller of the autonomous vehicle performs a weighted calculation on the obstacle speed a, the obstacle speed b and the obstacle speed c to obtain the regional risk value of the region 1.

The second implementation of this step is that, for each region, the controller of the autonomous vehicle determines, according to the obstacle speeds of all obstacles in the region on the current frame, the obstacle with the highest obstacle speed as the test obstacle in the region; alternatively, the controller of the autonomous vehicle performs, according to the obstacle speed of each obstacle in the region on the current frame and the second point cloud data of each obstacle in the region on the current frame, a weighted calculation on the obstacle speed and the second point cloud data of each obstacle in the region to obtain a parameter and then determine a maximum parameter, and the controller of the autonomous vehicle takes the obstacle corresponding to the maximum parameter as the test obstacle in the region. Alternatively, for each region, the controller of the autonomous vehicle determines, according to the second point cloud data of each obstacle in the region, the second point cloud data closest to the autonomous vehicle in the region, and determines the obstacle corresponding to the second point cloud data closest to the autonomous vehicle as the test obstacle in the region.

Then, for each region, the controller of the autonomous vehicle can directly determine, according to the second point cloud data of the test obstacle, the actual distance between the autonomous vehicle and the test obstacle in the region. Moreover, for each region, the controller of the autonomous vehicle calculates, according to the acceleration of the autonomous vehicle, the speed of the autonomous vehicle, the acceleration of the test obstacle and the speed of the test obstacle, the safety distance between the autonomous vehicle and the test obstacle in the region by an existing physical displacement calculation manner.

Then, for each region, the controller of the autonomous vehicle calculates, according to the actual distance between the autonomous vehicle and the test obstacle in the region and the safety distance between the autonomous vehicle and the test obstacle in the region, the difference between the actual distance of the test obstacle and the safety distance of the test obstacle, and takes the difference as the regional risk value of the region, where the larger the difference between the actual distance and the safety distance, the smaller the regional risk value of the region.

For example, based on the region division diagram of FIG. 2, the controller of the autonomous vehicle acquires the second point cloud data 1 of the obstacle a, the second point cloud data 2 of the obstacle b and the second point cloud data 3 of the obstacle c in the region 1; the controller of the autonomous vehicle calculates the obstacle speed a of the obstacle a, the obstacle speed b of the obstacle b and the obstacle speed c of the obstacle c in the region 1; the controller of the autonomous vehicle performs a weighted calculation on the second point cloud data 1 and the obstacle speed a of the obstacle a to obtain a parameter 1; the controller of the autonomous vehicle performs a weighted calculation on the second point cloud data 2 and the obstacle speed b of the obstacle b to obtain a parameter 2; the controller of the autonomous vehicle performs a weighted calculation on the second point cloud data 3 and the obstacle speed c of the obstacle c to obtain a parameter 3; when the controller of the autonomous vehicle determines that the parameter 2 is the largest, it determines that the obstacle b is the test obstacle of the region 1. The controller of the autonomous vehicle can calculate the actual distance and the safety distance of the test obstacle in the region 1; the controller of the autonomous vehicle calculates the difference between the actual distance and the safety distance, and takes the absolute value of the difference as the regional risk value of the region 1, or directly takes the difference as the regional risk value of the region 1.

Step 207, determining, according to the regional risk values of all regions, a collision risk value, where the collision risk value represents a possibility of collision of the autonomous vehicle.

The step 207 includes following implementations:

A first implementation of step 207: performing, according to a preset collision risk weight corresponding to each region one to one, a weighted calculation on the regional risk values of all regions to obtain the collision risk value.

A second implementation of step 207: calculating the regional risk values of all regions by adopting a linear judgment manner to obtain the collision risk value.

In this step, specifically, the controller of the autonomous vehicle determines, according to the regional risk values of all regions, the collision risk value, where the collision risk value represents the possibility of collision of the autonomous vehicle.

The first implementation of this step is that, the controller of the autonomous vehicle divides the surroundings of the autonomous vehicle into a plurality of regions, and each region corresponds to a collision risk weight. The collision risk weight is a preset value, that is, an empirical value. The controller of the autonomous vehicle performs, according to the regional risk value of each region and the collision risk weight of each region, a weighted calculation on the regional risk values of all regions, and takes the obtained data value as the collision risk value.

For example, based on the region division diagram of FIG. 2, the controller of the autonomous vehicle can calculate the regional risk value 1 of the region 1, the regional risk value 2 of the region 2, the regional risk value 3 of the region 3 and the regional risk value 4 of the region 4 by adopting the above calculation manner. A collision risk weight 1 is set for the region 1, a collision risk weight 2 is set for the region 2, a collision risk weight 3 is set for the region 3, and a collision risk weight 4 is set for the region 4. The controller of the autonomous vehicle adopts the formula of (regional risk value 1×collision risk weight 1+regional risk value 2×collision risk weight 2+regional risk value 3×collision risk weight 3+regional risk value 4×collision risk weight 4)/4 for calculation and obtains a data value that is the collision risk value of the autonomous vehicle.

The second implementation of this step is that, the controller of the autonomous vehicle adopts a linear judgment manner to calculate the collision risk value according to the regional risk values of all regions. The controller of the autonomous vehicle can adopt a linear judgment manner to calculate the collision risk value according to the regional risk value of each region and the collision risk weight of each region.

For example, upon the region division diagram of FIG. 2, the controller of the autonomous vehicle can calculate the regional risk value 1 of the region 1, the regional risk value 2 of the region 2, the regional risk value 3 of the region 3 and the regional risk value 4 of the region 4 by adopting the above calculation manner. The collision risk weight 1 is set for the region 1, the collision risk weight 2 is set for the region 2, the collision risk weight 3 is set for the region 3, and the collision risk weight 4 is set for the region 4. The controller of the autonomous vehicle calculates that (regional risk value 1×collision risk weight 1+regional risk value 3×collision risk weight 3) equals to data value 1, and (regional risk value 2×collision risk weight 2+regional risk value 3×collision risk weight 3) equals to data value 2. If the controller of the autonomous vehicle determines that the data value 1 is greater than the data value 2, it determines that the collision risk value is a; if the controller of the autonomous vehicle determines that the data value 1 is less than or equal to the data value 2, it determines that the collision risk value is b.

The present embodiment detects the first point cloud data of each obstacle, and the first point cloud data represents coordinate information of obstacles surrounding the autonomous vehicle, where the coordinate information of the obstacles is based on a world coordinate system; the controller converts the first point cloud data into the second point cloud data based on a relative coordinate system; the controller finally determines, according to the second point cloud data of each obstacle in each region, the collision risk value, where the collision risk value represents the possibility of collision of the autonomous vehicle. Therefore, thereby the possibility of collision of the autonomous vehicle is judged in real time and accurately during the operation of the autonomous vehicle. In addition, the solution provides a de-positioning manner for collision detection without depending on the world coordinate system and without depending on more modules or on subsystems based on parameters of the world coordinate system, thereby improving the reliability and stability of collision detection. Moreover, when the positioning system of the autonomous vehicle fails, the collision detection can be completed by adopting this solution.

Figure 5:
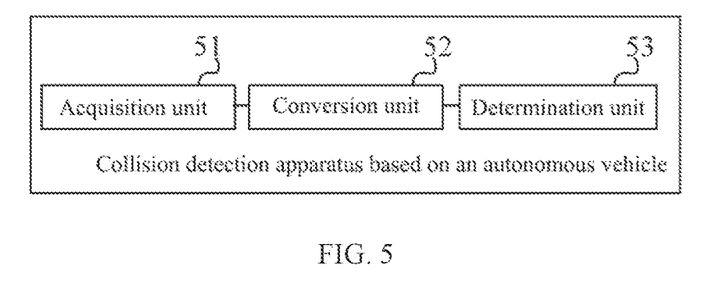
FIG. 5 is a schematic structural diagram of a collision detection apparatus based on an autonomous vehicle according to an embodiment of the present application.

FIG. 5 is a schematic structural diagram of a collision detection apparatus based on an autonomous vehicle according to an embodiment of the present application. As shown in FIG. 5, the collision detection apparatus based on an autonomous vehicle provided by the present embodiment includes:

an acquisition unit 51, configured to acquire first point cloud data of each obstacle in each region around the autonomous vehicle, where the first point cloud data represents coordinate information of the obstacle, and the first point cloud data is based on a world coordinate system;

a conversion unit 52, configured to convert the first point cloud data of the each obstacle into second point cloud data based on a relative coordinate system, where an origin of the relative coordinate system is a point on the autonomous vehicle;

a determination unit 53, configured to determine, according to the second point cloud data of the each obstacle in all regions, a collision risk value, where the collision risk value represents the possibility of collision of the autonomous vehicle.

The collision detection apparatus based on an autonomous vehicle provided by the present embodiment is the same as the technical solution in the collision detection method based on an autonomous vehicle provided by any one of the previous embodiments, and the implementation principle thereof is similar, which will not be repeated herein.

The present embodiment acquires first point cloud data of each obstacle in each region around the autonomous vehicle, where the first point cloud data represents coordinate information of the obstacle and the first point cloud data is based on a world coordinate system; converts the first point cloud data of the each obstacle into second point cloud data based on a relative coordinate system, where an origin of the relative coordinate system is a point on the autonomous vehicle; determines, according to the second point cloud data of the each obstacle in all regions, a collision risk value, where the collision risk value represents the possibility of collision of the autonomous vehicle. Therefore, the possibility of collision of the autonomous vehicle is judged in real time and accurately during the operation of the autonomous vehicle. In addition, the solution provides a de-positioning manner for collision detection without depending on the world coordinate system and without depending on more modules or on subsystems based on parameters of the world coordinate system, thereby improving the reliability and stability of collision detection. Moreover, when the positioning system of the autonomous vehicle fails, the collision detection can be completed by adopting this solution.

Figure 6:
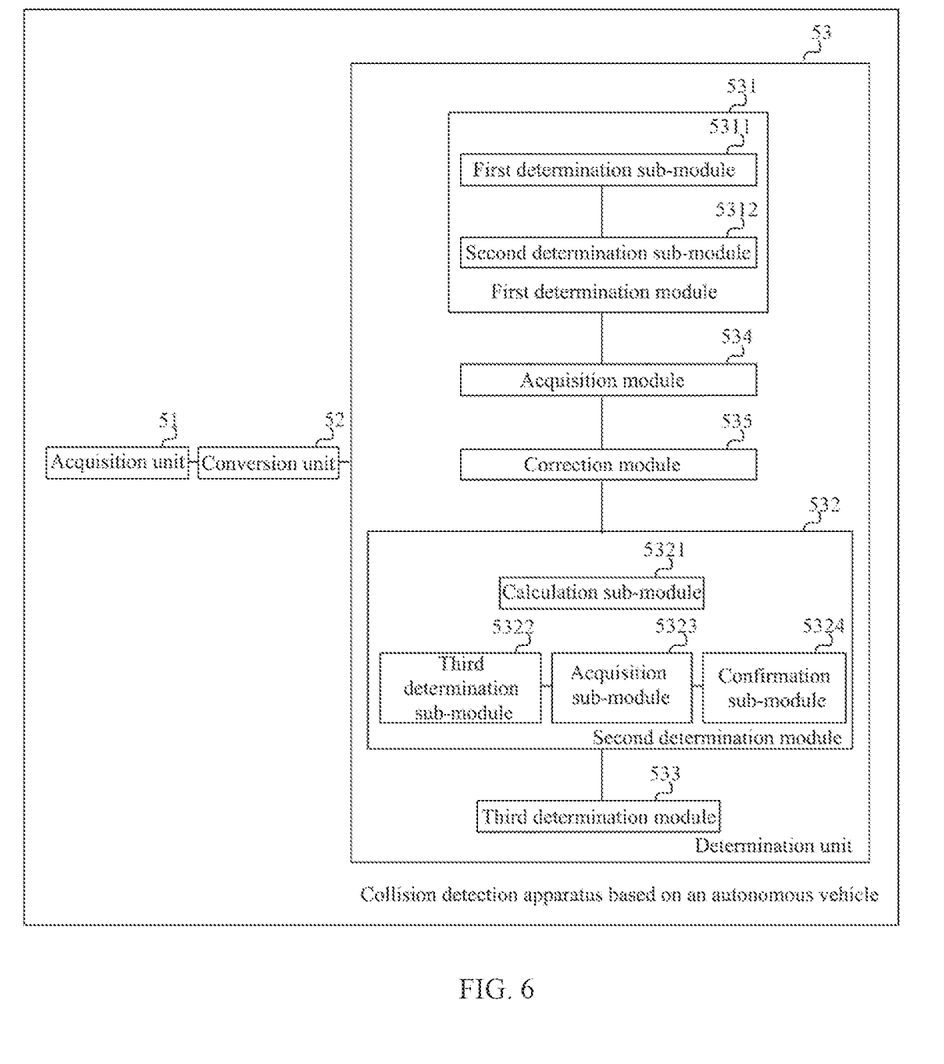
FIG. 6 is a schematic structural diagram of another collision detection apparatus based on an autonomous vehicle according to an embodiment of the present application.

FIG. 6 is a schematic structural diagram of another collision detection apparatus based on an autonomous vehicle according to an embodiment of the present application. On the basis of the embodiment shown in FIG. 5, as shown in FIG. 6, for the collision detection apparatus based on an autonomous vehicle provided by the present embodiment, the origin of the relative coordinate system is the center point of the autonomous vehicle, the X-axis of the relative coordinate system is the central axis of the autonomous vehicle, the Y-axis of the relative coordinate system passes through the origin and is perpendicular to the X-axis, the Z-axis of the relative coordinate system passes through the origin, and the Z-axis of the relative coordinate system is perpendicular to both the X-axis and the Y-axis.

The determination unit 53 includes:

a first determination module 531, configured to determine, according to the second point cloud data of the each obstacle, the obstacle speed of the each obstacle;

a second determination module 532, configured to determine, according to the obstacle speeds of all obstacles in the each region, the regional risk value of the each region;

a third determination module 533, configured to determine, according to the regional risk values of all regions, the collision risk value.

The first determination module 531 includes:

a first determination sub-module 5311, configured to determine, according to the second point cloud data of the each obstacle on at least two frames, a displacement value of the each obstacle;

a second determination sub-module 5312, configured to determine, according to both the displacement value of the each obstacle and the time corresponding to the at least two frames, the obstacle speed of the each obstacle.

The determination unit 53 further includes:

an acquisition module 534, configured to acquire the obstacle speed of the each obstacle on previous N frames after the first determination module 531 determines the obstacle speed of the each obstacle according to the second point cloud data of the each obstacle, where N is a positive integer great than or equal to 1;

a correction module 535, configured to correct, according to the obstacle speed of the each obstacle on the previous N frames, the obstacle speed of the each obstacle, to obtain the corrected obstacle speed of the each obstacle.

The second determination module 532 includes a calculation sub-module 5321, configured to perform a weighted calculation on the obstacle speeds of all obstacles in each region to obtain the regional risk value of each region.

Or, the second determination module 532 includes:

a third determination sub-module 5322, configured to determine, according to the obstacle speeds of all obstacles in the each region, a test obstacle in the each region;

an acquisition sub-module 5323, configured to acquire an actual distance and a safety distance of the test obstacle in each region, where the actual distance represents the actual distance between the test obstacle and the autonomous vehicle, and the safety distance represents the safety distance between the test obstacle and the autonomous vehicle;

a confirmation sub-module 5324, configured to determine a difference between the actual distance and the safety distance of the test obstacle in each region as the regional risk value of each region.

The acquisition sub-module 5323 is specifically configured to determine, according to the second point cloud data of the test obstacle in the each region, the actual distance of the test obstacle in the each region.

Or, the acquisition sub-module 5323 is specifically configured to acquire an autonomous vehicle acceleration and an autonomous vehicle speed of the autonomous vehicle and acquire an obstacle acceleration of the test obstacle in each region; determine, according to the obstacle acceleration of the test obstacle in the each region, the obstacle speed of the test obstacle in the each region, and the autonomous vehicle acceleration and the autonomous vehicle speed, the safety distance of the test obstacle in the each region.

The third determination module 533 is specifically configured to perform, according to a preset collision risk weight corresponding to the each region in a one-to-one relationship, a weighted calculation on the regional risk values of all regions to obtain the collision risk value.

Or, the third determination module 533 is specifically configured to perform a calculation on the regional risk values of all regions by adopting a linear judgment manner, to obtain the collision risk value.

The collision detection apparatus based on an autonomous vehicle provided by the present embodiment is the same as the technical solution in the collision detection method based on an autonomous vehicle provided by any one of the previous embodiments, and the implementation principle thereof is similar, which will not be repeated herein.

The present embodiment detects the first point cloud data of each obstacle, and the first point cloud data represents coordinate information of obstacles surrounding the autonomous vehicle, where the coordinate information of the obstacles is based on a world coordinate system; the controller converts the first point cloud data into the second point cloud data based on a relative coordinate system; the controller finally determines, according to the second point cloud data of each obstacle in each region, the collision risk value, where the collision risk value represents the possibility of collision of the autonomous vehicle. Therefore, the possibility of collision of the autonomous vehicle is judged in real time and accurately during the operation of the autonomous vehicle. In addition, the solution provides a de-positioning manner for collision detection without depending on the world coordinate system and without depending on more modules or on subsystems based on parameters of the world coordinate system, thereby improving the reliability and stability of collision detection. Moreover, when the positioning system of the autonomous vehicle fails, the collision detection can be completed by adopting this solution.

Figure 7:
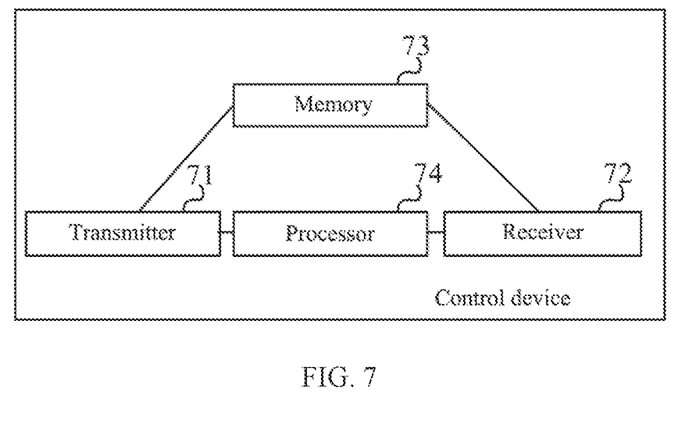
FIG. 7 is a schematic structural diagram of a control device according to an embodiment of the present application.

FIG. 7 is a schematic structural diagram of a control device provided by an embodiment of the present application. As shown in FIG. 7, the control device includes a transmitter 71, a receiver 72, a memory 73 and a processor 74.

The memory 73 is configured to store computer instructions; the processor 74 is configured to execute the computer instructions stored in the memory 73 to implement the technical solution of the collision detection method based on an autonomous vehicle of any implementation provided by the previous embodiment.

The present application also provides a storage medium, comprising: a readable storage medium and computer instructions stored in a readable storage medium; the computer instructions are used to implement the technical solution of the collision detection method based on an autonomous vehicle of any implementation provided by the previous embodiment.

In the specific implementation of the control device described above, it should be understood that the processor 74 may be a Central Processing Unit (CPU), or may be other general processors, a Digital Signal Processor (DSP), an Application Specific Integrated Circuit (ASIC), etc. The general processor may be a microprocessor, or the processor may be any conventional processor or the like. Steps of the method disclosed in the embodiment of the present application may be directly implemented as a hardware processor, or may be performed by a combination of hardware and software modules in the processor.

One of ordinary skill in the art will appreciate that all or part of the steps to implement each method embodiment described above may be accomplished by hardware associated with the program instructions. The above described program can be stored in a computer readable storage medium. When the program is executed, the steps including the above described method embodiment are performed; and the described storage medium includes: a read-only memory (ROM), a RAM, a flash memory, a hard disk, a solid state hard disk, a magnetic tape, a floppy disk, an optical disc, and any combination thereof.

Finally, it should be noted that the above embodiments are merely illustrative of the technical solutions of the present application, and are not to be taken in a limiting sense; although the present application has been described in detail with reference to the above embodiments, those skilled in the art shall understand that they may still modify the technical solutions described in the above embodiments, or equivalently substitute some or all of the technical features; and the modifications or substitutions do not deviate the nature of the corresponding technical solutions from the range of the technical solutions of each embodiment of the present application.

What is claimed is:

1. A collision detection method, implemented by a controller of an autonomous vehicle, comprising:

acquiring first point cloud data of each obstacle in each region around the autonomous vehicle, wherein the first point cloud data represents coordinate information of the each obstacle, and the first point cloud data is based on a world coordinate system;

converting the first point cloud data of the each obstacle into second point cloud data based on a relative coordinate system, wherein an origin of the relative coordinate system is a point on the autonomous vehicle;

determining, according to the second point cloud data of the each obstacle, an obstacle speed of the each obstacle;

determining, according to obstacle speeds of all obstacles within the each region, a test obstacle in the each region; acquiring an actual distance and a safety distance of the test obstacle in the each region, wherein the actual distance represents the actual distance between the test obstacle and the autonomous vehicle, and the safety distance represents the safety distance between the test obstacle and the autonomous vehicle; determining a difference between the actual distance and the safety distance of the test obstacle in the each region as a regional risk value of the each region;

determining, according to the regional risk value of the each region, a collision risk value, wherein the collision risk value represents a possibility of collision of the autonomous vehicle; and controlling driving of the autonomous vehicle, based on the determined collision risk value of the automatic vehicle, wherein the determining, according to obstacle speeds of all obstacles within the each region, a test obstacle in the each region, comprises:

performing a weighted calculation on the obstacle speed of each obstacle within the each region on a current frame and corresponding second point cloud data of the each obstacle on the current frame, to obtain parameters respectively corresponding to the all obstacles within the each region; determining a maximum parameter from the obtained parameters; and taking an obstacle within the each region that corresponds to the maximum parameter, as the test obstacle in the each region.

2. The method of claim 1, wherein the origin of the relative coordinate system is a center point of the autonomous vehicle, an X-axis of the relative coordinate system is a central axis of the autonomous vehicle, a Y-axis of the relative coordinate system passes through the origin and is perpendicular to the X-axis, a Z-axis of the relative coordinate system passes through the origin, and the Z-axis of the relative coordinate system is perpendicular to both the X-axis and the Y-axis.

3. The method of claim 1, wherein after the determining, according to the second point cloud data of the each obstacle, the obstacle speed of the each obstacle on the current frame, the method further comprises:

acquiring obstacle speeds of the each obstacle on previous N frames, wherein N is a positive integer great than or equal to 1; and correcting, according to the obstacle speeds of the each obstacle on the previous N frames, the obstacle speed of the each obstacle on the current frame, to obtain a corrected obstacle speed of the each obstacle on the current frame.

4. The method of claim 3, wherein the correcting, according to the obstacle speeds of the each obstacle on the previous N frames, the obstacle speed of the each obstacle on the current frame to obtain a corrected obstacle speed of the each obstacle on the current frame, comprises:

calculating a weighted average value of the obstacle speeds of the each obstacle on the previous N frames, as the corrected obstacle speed of the each obstacle on the current frame.

5. The method of claim 1, wherein the acquiring a safety distance of the test obstacle in the each region comprises: acquiring an autonomous vehicle acceleration and an autonomous vehicle speed of the autonomous vehicle and acquiring an obstacle acceleration of the test obstacle in the each region; and determining, according to the obstacle acceleration of the test obstacle in the each region, the obstacle speed of the test obstacle in the each region, and the autonomous vehicle acceleration and the autonomous vehicle speed, the safety distance of the test obstacle in the each region.

6. The method of claim 1, wherein the determining, according to the regional risk value of the each region, the collision risk value comprises:

performing a calculation on the regional risk values of all regions by adopting a linear judgment manner to obtain the collision risk value.

7. A non-transitory storage medium, comprising: a non-transitory readable storage medium and computer instructions, wherein the computer instructions are stored in the readable storage medium; and the computer instructions are configured to cause a processor to implement the collision detection method according to claim 1.

8. The method of claim 1, wherein the determining, according to a regional risk value of the each region, the collision risk value comprises:

performing a weighted calculation on the regional risk values of all regions, wherein the each region is multiplied by a corresponding preset collision risk weight in the weighted calculation; and taking a data value obtained from the weighted calculation, as the collision risk value.

9. A collision detection apparatus, implemented in an autonomous vehicle, comprising: a memory and a processor; wherein the memory is configured to store executable instructions of the processor; and the processor, when executing the executable instructions, is configured to:

acquire first point cloud data of each obstacle in each region around the autonomous vehicle, wherein the first point cloud data represents coordinate information of the each obstacle, and the first point cloud data is based on a world coordinate system;

convert the first point cloud data of the each obstacle into second point cloud data based on a relative coordinate system, wherein an origin of the relative coordinate system is a point on the autonomous vehicle;

determine, according to the second point cloud data of the each obstacle, an obstacle speed of the each obstacle;

determine, according to the obstacle speeds of all obstacles in the each region, a test obstacle in the each region; acquire an actual distance and a safety distance of the test obstacle in the each region, wherein the actual distance represents the actual distance between the test obstacle and the autonomous vehicle, and the safety distance represents the safety distance between the test obstacle and the autonomous vehicle; determine a difference between the actual distance and the safety distance of the test obstacle in the each region as a regional risk value of the each region;

determine, according to the regional risk values of the each region, a collision risk value, wherein the collision risk value represents the possibility of collision of the autonomous vehicle; and control driving of the autonomous vehicle, based on the determined collision risk value of the automatic vehicle, wherein the test obstacle in the each region is determined by:

performing a weighted calculation on the obstacle speed of each obstacle within the each region on a current frame and corresponding second point cloud data of the each obstacle on the current frame, to obtain parameters respectively corresponding to the all obstacles within the each region; determining a maximum parameter from the obtained parameters; and taking an obstacle within the each region that corresponds to the maximum parameter, as the test obstacle in the each region.

10. The apparatus of claim 9, wherein the origin of the relative coordinate system is a center point of the autonomous vehicle, an X-axis of the relative coordinate system is a central axis of the autonomous vehicle, a Y-axis of the relative coordinate system passes through the origin and is perpendicular to the X-axis, a Z-axis of the relative coordinate system passes through the origin, and the Z-axis of the relative coordinate system is perpendicular to both the X-axis and the Y-axis.

11. The apparatus of claim 9, wherein the processor is further configured to:
    determine, according to the second point cloud data of the each obstacle on at least two frames, a displacement value of the each obstacle, wherein the displacement value represents displacement of the each obstacle in a period of time corresponding to the at least two frames; and
    determine, according to the displacement value of the each obstacle and the period of time corresponding to the at least two frames, the obstacle speed of the each obstacle.

12. The apparatus of claim 9, wherein the processor is further configured to:
    acquire obstacle speeds of the each obstacle on previous N frames after the obstacle speed of the each obstacle on a current frame is determined according to the second point cloud data of the each obstacle, wherein N is a positive integer great than or equal to 1; and
    correct, according to the obstacle speeds of the each obstacle on the previous N frames, the obstacle speed of the each obstacle on the current frame, to obtain a corrected obstacle speed of the each obstacle on the current frame.

13. The apparatus of claim 9, wherein the processor is further configured to:
    determine, according to the second point cloud data of the test obstacle in the each region, the actual distance of the test obstacle in the each region.

14. The apparatus of claim 9, wherein the processor is further configured to:
    acquire an autonomous vehicle acceleration and an autonomous vehicle speed of the autonomous vehicle and acquire an obstacle acceleration of the test obstacle in the each region; and
    determine, according to the obstacle acceleration of the test obstacle in the each region, the obstacle speed of the test obstacle in the each region, and the autonomous vehicle acceleration and the autonomous vehicle speed, the safety distance of the test obstacle in the each region.

15. The apparatus of claim 9, wherein the processor is further configured to:
    perform, according to a preset collision risk weight corresponding to the each region in a one-to-one relationship, a weighted calculation on the regional risk values of all the regions, to obtain the collision risk value.

16. The apparatus of claim 9, wherein the processor is further configured to:
    perform a calculation on the regional risk values of all the regions by adopting a linear judgment manner to obtain the collision risk value.

17. The apparatus of claim 9, wherein the processor is further configured to:
    calculate a weighted average value of the obstacle speeds of the each obstacle on the previous N frames, as the corrected obstacle speed of the each obstacle on the current frame.

* * * * *